(12) United States Patent
Zhao et al.

(10) Patent No.: US 9,825,699 B2
(45) Date of Patent: Nov. 21, 2017

(54) METHOD AND APPARATUS FOR CORRECTING INTER-CHANNEL POWER IMBALANCE AND RECEIVER

(71) Applicant: FUJITSU LIMITED, Kawasaki (JP)

(72) Inventors: Ying Zhao, Beijing (CN); Liang Dou, Beijing (CN); Zhenning Tao, Beijing (CN); Taku Saito, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 10 days.

(21) Appl. No.: 15/008,610

(22) Filed: Jan. 28, 2016

(65) Prior Publication Data

US 2016/0226583 A1 Aug. 4, 2016

(30) Foreign Application Priority Data

Jan. 30, 2015 (CN) .......................... 2015 1 0048271

(51) Int. Cl.
*H04B 10/079* (2013.01)
*H04L 1/00* (2006.01)
*H04B 10/61* (2013.01)
*H04J 14/02* (2006.01)

(52) U.S. Cl.
CPC . *H04B 10/07955* (2013.01); *H04B 10/07957* (2013.01); *H04B 10/616* (2013.01); *H04J 14/0221* (2013.01); *H04L 1/0048* (2013.01)

(58) Field of Classification Search
CPC .................... H04B 10/07955; H04B 10/07957
See application file for complete search history.

(56) References Cited

U.S. PATENT DOCUMENTS

| | | | | |
|---|---|---|---|---|
| 2012/0220292 | A1* | 8/2012 | Yu ..................... | H04W 72/0473 455/424 |
| 2012/0316691 | A1* | 12/2012 | Boardman ............... | H02J 3/26 700/293 |
| 2014/0355721 | A1* | 12/2014 | Jacob ....................... | H04B 1/10 375/340 |
| 2015/0117856 | A1* | 4/2015 | Vassilieva .......... | H04B 10/2572 398/33 |
| 2016/0183200 | A1* | 6/2016 | Kanamarlapudi .... | H04W 52/34 455/522 |

* cited by examiner

*Primary Examiner* — Dzung Tran
(74) *Attorney, Agent, or Firm* — Staas & Halsey LLP

(57) ABSTRACT

A method and apparatus for correcting inter-channel power imbalance and a receiver, applicable to a receiver in a multicarrier optical communication system, where the method includes: receiving by the receiver reference information transmitted by a neighboring receiver; and performing power imbalance error correction by the receiver according to the reference information. With this application, based on performing signal processing in the receiver, estimation errors produced due to power imbalance in the central channel and the neighboring channel may be reduced.

20 Claims, 10 Drawing Sheets

PR

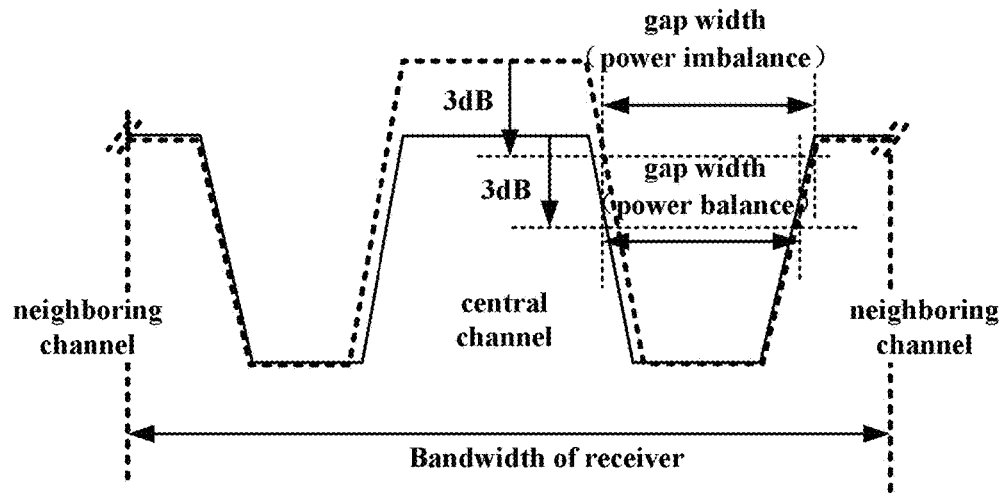
FIG. 3
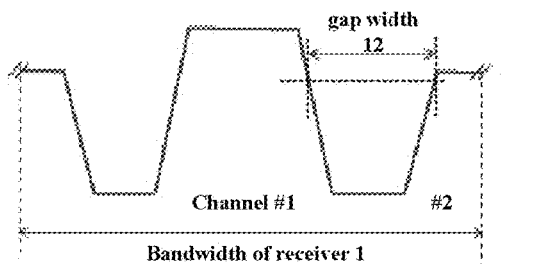   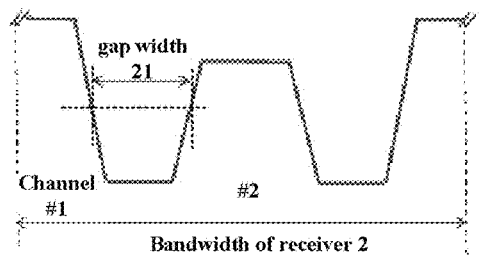
FIG. 4   FIG. 5
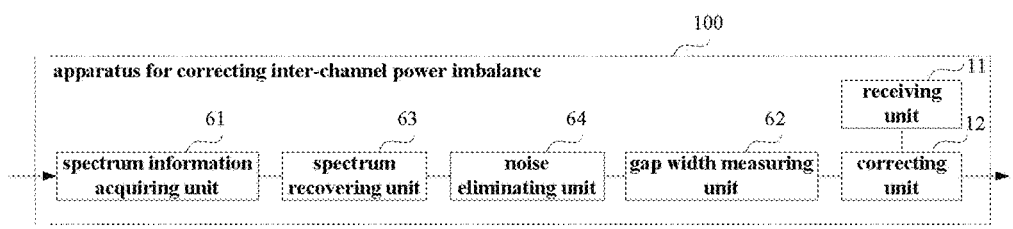
FIG. 6

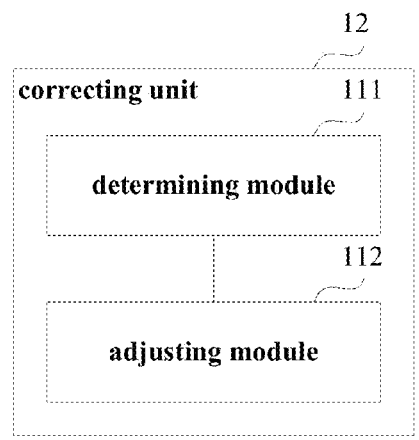
FIG. 11
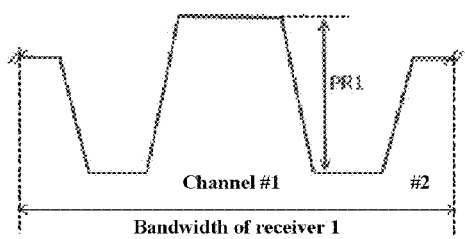 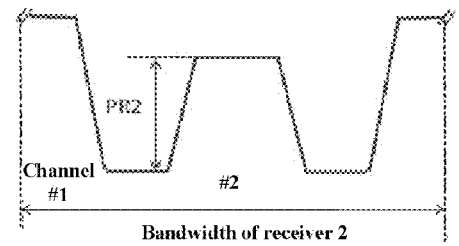
FIG. 12          FIG. 13
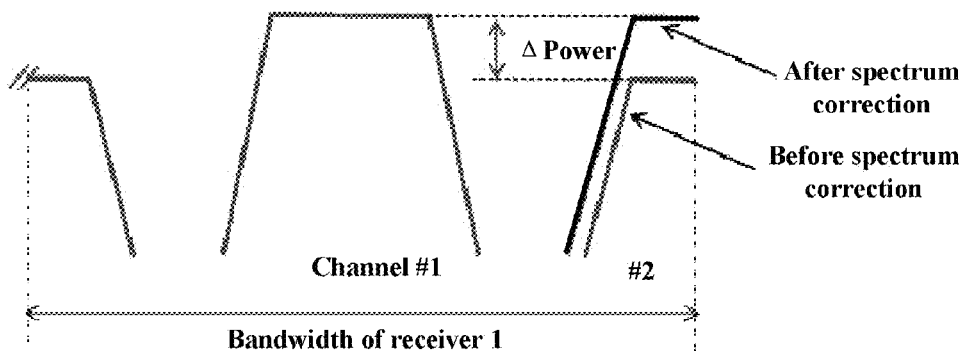
FIG. 14

METHOD AND APPARATUS FOR CORRECTING INTER-CHANNEL POWER IMBALANCE AND RECEIVER

CROSS-REFERENCE TO RELATED APPLICATIONS

This application relates to the subject matter of the Chinese patent application for invention, Application No. 201510048271.9, filed with Chinese State Intellectual Property Office on Jan. 30, 2015. The disclosure of this Chinese application is considered part of and is incorporated by reference in the disclosure of this application.

BACKGROUND

1. Field

The present disclosure relates to the field of multicarrier optical communication system, and in particular to a method and apparatus for correcting inter-channel power imbalance and a receiver.

2. Description of the Related Art

In a multicarrier optical communication system, subcarrier data are modulated in several optical carriers independent of each other. Under an ideal condition, wavelengths of lasers are stable, and spacing of wavelengths of the carriers is constant. In a practical system, as wavelengths of lasers are influenced by variation of driving currents, temperature fluctuation, and resonant cavity aging, etc., output carrier wavelengths drift in a certain range. Such indefinite variation of wavelengths brings relatively large influence to the multicarrier optical communication system, which is mainly embodied in: 1) occurrence of neighboring channel crosstalk between channels of the subcarriers; and 2) edge subcarriers being subjected to more severe distortion.

An effective wavelength monitoring method is an important means for overcoming drift of laser wavelengths. On a basis of monitoring wavelengths, the wavelengths of the lasers may be adjusted with respect to feedback, so as to avoid variation of wavelengths to a great extent, thereby achieving locking of wavelengths of the subcarriers. Stable wavelengths of subcarriers can not only avoid neighboring channel crosstalk, but also make spectrum resources being used more efficiently, thereby improving spectrum utilization.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Wavelength monitoring is a basis for achieving locking of subcarrier wavelength, and is also an effective means for further optimizing a multicarrier optical communication system. In a process of achieving wavelength monitoring, introduction of extra hardware overhead is not expected, hence, attention is paid to a scheme in which wavelength monitoring based on digital signal processing is performed in a receiver. Furthermore, in a process of performing wavelength monitoring, various parameters, such as channel spacing, and an inter-channel signal power ratio, etc., need to be estimated. However, as power of a central channel and power of a neighboring channel are different, it is prone to produce an estimation error. In order to overcome the estimation error, a method and apparatus for correcting inter-channel power imbalance and a receiver are provided in this application.

This application provides a method and apparatus for correcting inter-channel power imbalance and a receiver, which are based on signal processing performed in an optical receiver, so as to reduce estimation errors produced due to power imbalance in a central channel and a neighboring channel.

According to a first aspect of the embodiments, there is provided a method for correcting inter-channel power imbalance, applicable to a receiver in a multicarrier optical communication system, the method including:

receiving by the receiver reference information transmitted by a neighboring receiver; and performing power imbalance error correction by the receiver according to the reference information.

According to a second aspect of the embodiments, there is provided a method as described in the first aspect, wherein the reference information is an estimation result of a spectrum gap width between a first channel and a second channel in the neighboring receiver, and the performing power imbalance error correction by the receiver according to the reference information includes:

averaging or weighted averaging an estimation result of a spectrum gap width between the first channel and the second channel in the receiver and the estimation result of the spectrum gap width between the first channel and the second channel in the neighboring receiver; and identifying the averaged or weighted averaged value as the spectrum gap width between the first channel and the second channel;

wherein, the first channel is a central channel in the receiver and a neighboring channel in the neighboring receiver, and the second channel is a central channel in the neighboring receiver and a neighboring channel in the receiver.

According to a third aspect of the embodiments, there is provided a method as described in the first aspect, wherein the reference information is a power ratio of the second channel to a noise floor calculated in the neighboring receiver, or power of the second channel calculated in the neighboring receiver, and the performing power imbalance error correction by the receiver according to the reference information includes:

determining a signal power ratio between the first channel and the second channel according to a power ratio of the first channel to the noise floor and the power ratio of the second channel to the noise floor or according to power of the first channel and the power of the second channel; and adjusting the power or reference power of the second channel according to the signal power ratio;

wherein, the first channel is a central channel in the receiver and a neighboring channel in the neighboring receiver, and the second channel is a central channel in the neighboring receiver and a neighboring channel in the receiver.

According to a fourth aspect of the embodiments, there is provided an apparatus for correcting inter-channel power imbalance, applicable to a receiver in a multicarrier optical communication system, the apparatus including:

a receiving unit configured to receive reference information transmitted by a neighboring receiver; and a correcting unit configured to perform power imbalance error correction according to the reference information.

According to a fifth aspect of the embodiments, there is provided an apparatus as described in the fourth aspect, wherein the reference information is an estimation result of a spectrum gap width between a first channel and a second channel in the neighboring receiver, and the correcting unit includes:

a calculating module configured to average or weighted average an estimation result of a spectrum gap width between the first channel and the second channel in the receiver and the estimation result of the spectrum gap width between the first channel and the second channel in the neighboring receiver; and a correcting module configured to identify the averaged or weighted averaged value as the spectrum gap width between the first channel and the second channel;

wherein, the first channel is a central channel in the receiver and a neighboring channel in the neighboring receiver, and the second channel is a central channel in the neighboring receiver and a neighboring channel in the receiver.

According to a sixth aspect of the embodiments, there is provided an apparatus as described in the fourth aspect, wherein the reference information is a power ratio of the second channel to a noise floor calculated in the neighboring receiver, or power of the second channel calculated in the neighboring receiver, and the correcting unit comprises:

a determining module configured to determine a signal power ratio between the first channel and the second channel according to a power ratio of the first channel to the noise floor and the power ratio of the second channel to the noise floor or according to power of the first channel and the power of the second channel; and an adjusting module configured to adjust the power or reference power of the second channel according to the signal power ratio;

wherein, the first channel is a central channel in the receiver and a neighboring channel in the neighboring receiver, and the second channel is a central channel in the neighboring receiver and a neighboring channel in the receiver.

According to a seventh aspect of the embodiments, there is provided a coherent optical receiver, including the apparatus for correcting inter-channel power imbalance as described above.

An advantage of the embodiments of the present disclosure exists in that with this application, based on performing signal processing in the receiver, estimation errors produced due to power imbalance in the central channel and the neighboring channel may be reduced.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups there.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is clear and understood that the accompanying drawings in the following description are some embodiments of the present disclosure only, and a person of ordinary skill in the art may obtain other accompanying drawings according to these accompanying drawings without making an inventive effort. In the drawings:

FIG. 3 is a schematic diagram of influence brought by power imbalance between a central channel and a neighboring channel;

FIG. 4 is a schematic diagram of a spectrum of a receiver 1;

FIG. 5 is a schematic diagram of a spectrum of a receiver 2;

FIG. 6 is a schematic diagram of a structure of an implementation of the apparatus for correcting inter-channel power imbalance of the embodiment;

FIG. 11 is a schematic diagram of a structure of another implementation of the correcting unit;

FIG. 12 is a schematic diagram of a spectrum of a receiver 1;

FIG. 13 is a schematic diagram of a spectrum of a receiver 2;

FIG. 14 is a schematic diagram of adjusting power of the receiver 2;

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

Embodiment 1

Figure 1:
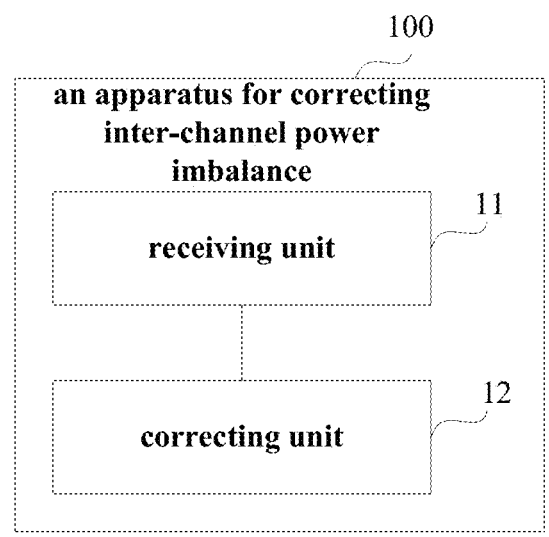
FIG. 1 is a schematic diagram of a structure of the apparatus for correcting inter-channel power imbalance of the embodiment.

An embodiment of this application provides an apparatus for correcting inter-channel power imbalance, applicable to a receiver, such as a coherent optical receiver, in a multi-carrier optical communication system. FIG. 1 is a schematic diagram of a structure of the apparatus. Referring to FIG. 1, the apparatus 100 for correcting inter-channel power imbalance includes a receiving unit 11 and a correcting unit 12; wherein, the receiving unit 11 is configured to receive reference information transmitted by a neighboring receiver;

and the correcting unit 12 is configured to perform power imbalance error correction according to the reference information.

In this embodiment, the reference information received by the receiving unit 11 may be an estimation result of monitoring parameters of a channel state in the neighboring receiver, and these parameters may be used for wavelength monitoring, and also be used for other purposes. For example, these parameters may include a gap width, an optical signal to noise ratio (OSNR), channel power, and a bit error rate, etc. The neighboring receiver provides these parameters to a current receiver, and the correcting unit 12 of the current receiver may perform power imbalance error correction with reference to these parameters.

As the estimation result of the neighboring receiver is referred to, accuracy of estimating the above parameters is improved, and estimation errors produced due to power imbalance in the central channel and the neighboring channel is reduced.

Figure 2:
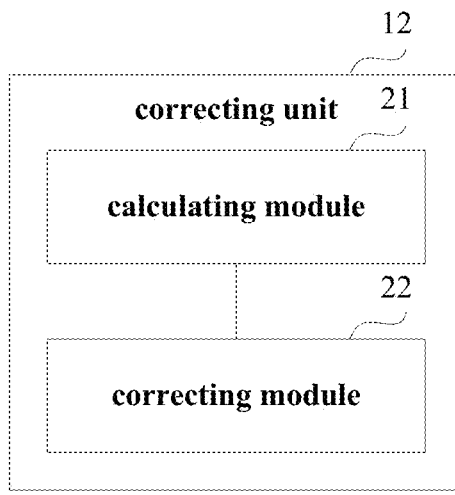
FIG. 2 is a schematic diagram of a structure of an implementation of a correcting unit.

FIG. 2 is a schematic diagram of a structure of an implementation of the correcting unit 12. In this implementation, the reference information is an estimation result of a spectrum gap width between a first channel and a second channel in the neighboring receiver, and the first channel here refers to a central channel in the current receiver and at the same time, a neighboring channel in the neighboring receiver, and the second channel refers to a central channel in the neighboring receiver and at the same time, a neighboring channel in the current receiver.

Referring to FIG. 2, the correcting unit 12 includes a calculating module 21 and a correcting module 22; wherein, the calculating module 21 is configured to average or weighted average an estimation result of a spectrum gap width between the first channel and the second channel in a local receiver (the current receiver) and the estimation result of the spectrum gap width between the first channel and the second channel in the neighboring receiver, and the correcting module 22 is configured to identify the averaged or weighted averaged value as the spectrum gap width between the first channel and the second channel.

FIG. 3 is a schematic diagram of an application scenario of this embodiment. As shown in FIG. 3, assuming that power of the central channel is higher than that of the neighboring channel, a reference power level of a flat area of the central channel dropped by 3 dB shall be higher than a reference power level in case of power balance, which results in that an estimated value of a gap width in case of power imbalance is greater than that in case of power balance. The overestimated gap width will bring an error to judgment of channel spacing, thereby affecting accuracy of wavelength monitoring.

In order to overcome the estimation error shown in FIG. 3, the estimated value of a gap with deviation needs to be corrected. With the correcting unit 12 of FIG. 2, estimated values on the same gap in two neighboring receivers may be used to correct a power imbalance error.

FIGS. 4 and 5 are schematic diagrams of correction principles of this implementation. FIG. 4 shows a spectrum received by a receiver 1, a channel #1 in this receiver 1 being a central channel, and a channel #2 being a right neighboring channel. Assuming that power of the channel 1 is higher than that of the channel 2, an estimated value of a right gap width will be greater than an actual value. And at the same time, for an estimation of the same gap by the neighboring receiver 2, as shown in FIG. 5, in the receiver 2, as the channel #2 is a central channel, the channel #1 is a left neighboring channel, and power of the channel #2 is less than that of the channel #1, an estimated value of the left gap width will be less than an actual value. Viewing from the estimated values of the gap obtained by the receiver 1 and the receiver 2, the receiver 1 is overestimated, and the receiver 2 is underestimated. Hence, estimation errors may be obviously reduced and an estimated value in consistence with an actual value may be obtained by averaging or weighted averaging the two values.

With the method of this implementation, influence of the power imbalance is corrected by performing error counter-action by using a neighboring receiver, and accuracy of gap estimation is improved by introducing the method of this embodiment into the gap estimation. It should be noted that this method is a method using a neighboring receiver to perform power imbalance correction, and such a method does not rely on how to calculate a gap width in a receiver.

FIG. 6 is a schematic diagram of a structure of the apparatus for correcting inter-channel power imbalance of this implementation. As shown in FIG. 6, in this implementation, alternatively, the apparatus 100 for correcting inter-channel power imbalance may further include a spectrum information acquiring unit 61 and a gap width measuring unit 62; wherein, the spectrum information acquiring unit 61 is configured to acquire a received signal and extract spectrum information from the received signal;

and the gap width measuring unit 62 is configured to determine reference power according to a predefined reference power level, and take a frequency difference between two frequency points on a gap between the first channel and the second channel in the spectrum information of the received signal corresponding to the reference power as an estimation result of the spectrum gap width between the first channel and the second channel in the receiver.

Figure 7:
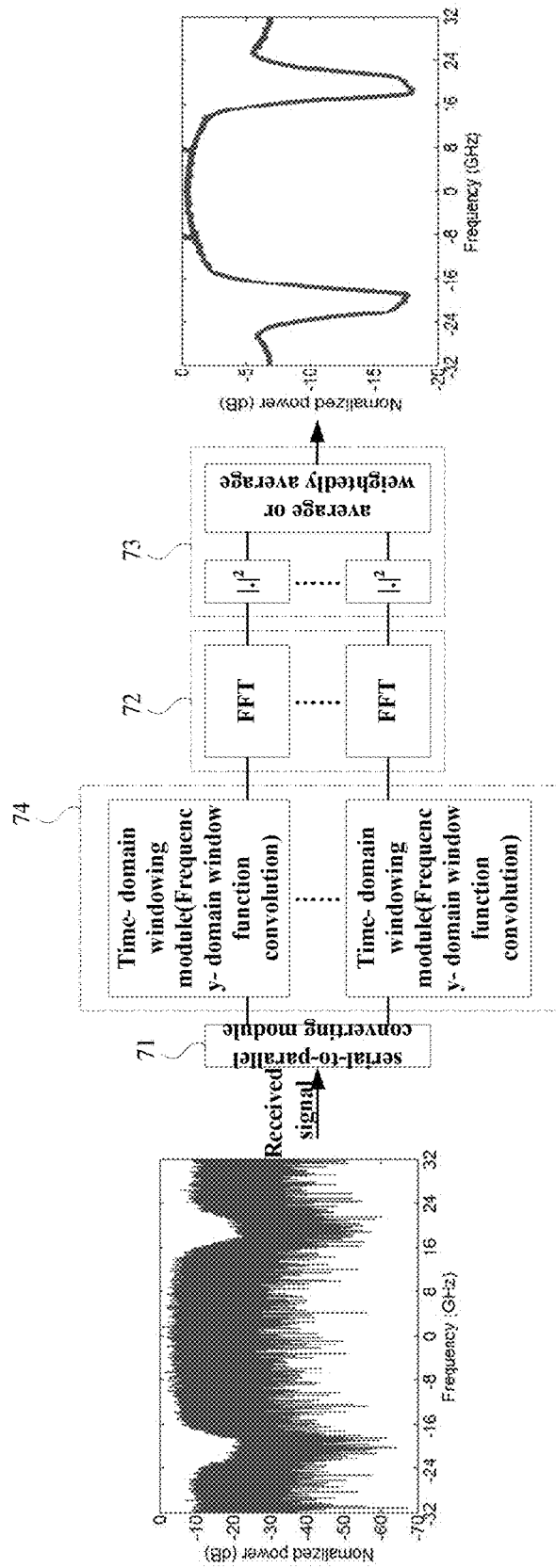
FIG. 7 is a schematic diagram of a principle of a spectrum information acquiring unit.

FIG. 7 is a schematic diagram of a structure of an implementation of the spectrum information acquiring unit 61. As shown in FIG. 7, in this implementation, the spectrum information acquiring unit 61 may include a serial-to-parallel converting module 71, a Fourier transform module 72 and a calculating module 73. The serial-to-parallel converting module 71 is configured to divide a received signal into a predefined number of sections, there existing overlapping between sections, or there existing no overlapping between sections; for example, a sampling sequence of M×N points are serially-parallel converted into M sections of subsequences, each section having N points. The Fourier transform module 72 is configured to perform Fourier transform on each section of signal, so as to obtain a spectrum of each section of signal, that is, convert each section of signal from a time domain into a frequency domain; for example, fast Fourier transform is performed on each section of subsequence respectively, so as to obtain its spectrum. And the calculating module 73 is configured to calculate a modular square of the spectrum of each section of signal, so as to obtain a power spectrum of each section of signal, thereby reflecting a power spectrum shape in the frequency domain, and average or weighted average power spectra of all sections of signals, so as to obtain an averaged power spectrum of all the sections of signals as an extracted spectrum information. In this way, random information in each section of signal may be effectively suppressed after the average, with an outputted smooth spectrum being as shown in the right of FIG. 3.

In this implementation, alternatively, the spectrum information acquiring unit 61 may further include a time-domain windowing module 74, as shown in FIG. 7. The time-domain windowing module 74 is located after the serial-to-parallel converting module 71 and before the Fourier transform module 72, and is configured to directly perform window function convolution on the spectrum of each section of signal. For example, the spectrum of each section of signal is convoluted with a specific window function, so as to achieve an effect of spectrum smoothing.

In this implementation, after the spectrum information of the received signal is obtained, the gap width measuring unit 62 may measure the spectrum gap width according to the spectrum information.

Figure 8:
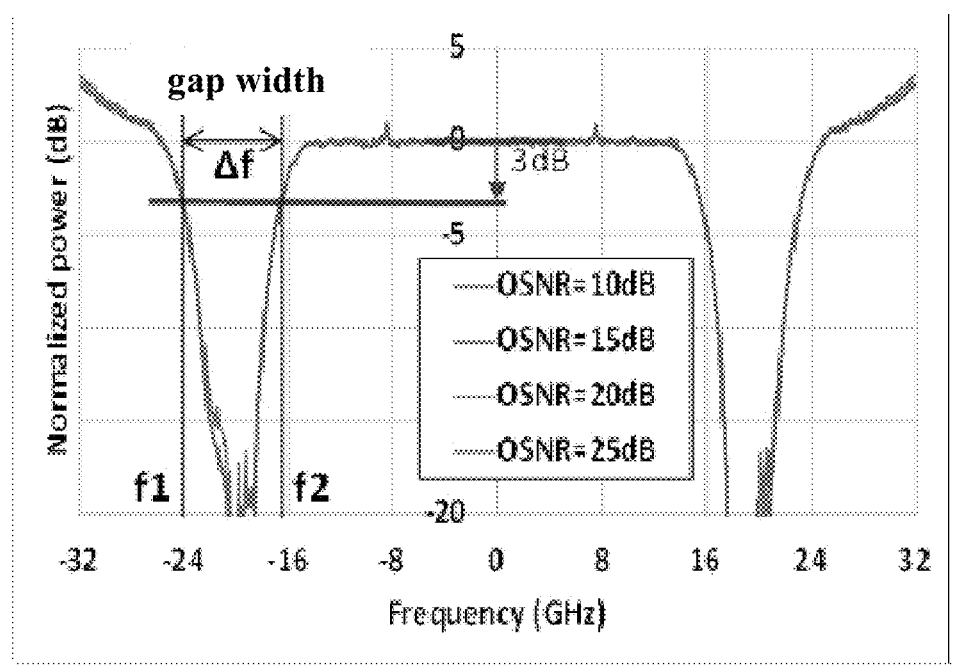
FIG. 8 is a schematic diagram of a principle of a gap width measuring unit.

FIG. 8 is a schematic diagram of a structure of an implementation of the gap width measuring unit 62. In this implementation, the spectrum shown in FIG. 8 may be directly extracted from the received signal, and may also be a spectrum obtained by processing the spectrum extracted from the received signal. For example, spectrum recovery, and noise elimination, etc., are performed on the spectrum extracted from the received signal, which shall be described below.

In this embodiment, as shown in FIG. 8, in order to measure the spectrum gap width, a reference power level needs to be selected first. In an implementation, a power level 3 dB lower than a power value of the flat area of the central channel may be selected as the reference power level. It should be noted that 3 dB is not a compulsory value, other numerical values may also be selected in this embodiment, and such numerical values are not limited in this embodiment. After the reference power level is selected, frequency points f1 and f2 in the left or right gap corresponding to this power may be determined. After the frequency points f1 and f2 are found, a value of $\Delta f=|f2-f1|$ is calculated and is taken as the spectrum gap width.

In this implementation, as shown in FIG. 6, alternatively, the apparatus 100 for correcting inter-channel power imbalance may further include a spectrum recovering unit 63, wherein, the spectrum recovering unit 63 is configured to perform spectrum recovery on an input signal, and take the spectrum recovered signal as an input signal of a next step of processing.

As shown in FIG. 6, in this implementation, the spectrum recovering unit 63 is located after the spectrum information acquiring unit 61, its input is the spectrum information acquired by the spectrum information acquiring unit 61, and its output is input of a next step of processing. In this implementation, the spectrum recovering unit 63 obtains a spectrum recovered signal by performing spectrum recovery on the spectrum information acquired by the spectrum information acquiring unit 61, and takes it as input of a next step of processing. If the next step of processing is the gap width measuring unit 62, the gap width measuring unit 62 measures the spectrum gap width according to the spectrum outputted by the spectrum recovering unit 63.

Figure 9:
FIG. 9 is a schematic diagram of a principle of a spectrum recovering unit.

FIG. 9 is a schematic diagram of an implementation of the spectrum recovering unit 63. In this implementation, the spectrum information extracted by the spectrum information acquiring unit 61, i.e. a smoothed spectrum with influence of random data being eliminated, is shown in the left spectrum diagram in FIG. 9. As a spectrum response of the receiver is not flat, it will result in that distortion of a spectrum of a neighboring channel is relatively severe. If no spectrum recovery is performed, it will result in relatively large gap width estimation deviation.

In this implementation, an operation of the spectrum recovery may be performed on a smoothed distortion spectrum by the spectrum recovering unit 63, in particular, by multiplying amplitude of each frequency point of the distortion spectrum by a correction coefficient; wherein, the correction coefficient may be a reciprocal of response amplitude of a receiver at each frequency point, and may also be other values. After this operation, a recovered spectrum is as shown in the right spectrum diagram in FIG. 9, and the spectrum of the central channel is also smoothed while power of the neighboring channel is improved obviously. And the accuracy of estimation of the gap width by using such a spectrum will be outstandingly improved.

In this implementation, there are a pair of pilot signals at positions of ±8 GHz in the left and right spectrum diagrams in FIG. 9, which are not necessary in this implementation, but have no effect on the accuracy of the estimation of the gap.

In this implementation, as shown in FIG. 6, alternatively, the apparatus 100 for correcting inter-channel power imbalance may further include a noise eliminating unit 64, wherein the noise eliminating unit 64 is configured to determine noise floor power of the input signal, and subtract the noise floor power at each frequency point of the input signal, so as to obtain a noise eliminated signal as an input signal of a next step of processing.

As shown in FIG. 6, in this implementation, the noise eliminating unit 64 is located after the spectrum recovering unit 63, its input is the spectrum recovered by the spectrum recovering unit 63, and its output is provided to the gap width measuring unit 62; that is, the gap width measuring unit 62 performs the spectrum gap measurement based on the noise eliminated spectrum. However, this implementation is not limited thereto, and in particular implementation, the noise eliminating unit 64 may also be located before the spectrum recovering unit 63 and after the spectrum information acquiring unit 61; at this moment, its input is the spectrum extracted by the spectrum information acquiring unit 61, and its output is the input of the spectrum recovering unit 63. And the noise eliminating unit 64 performs noise elimination on the spectrum extracted by the spectrum information acquiring unit 61, and outputs the noise eliminated spectrum to the spectrum recovering unit 63.

Figure 10:
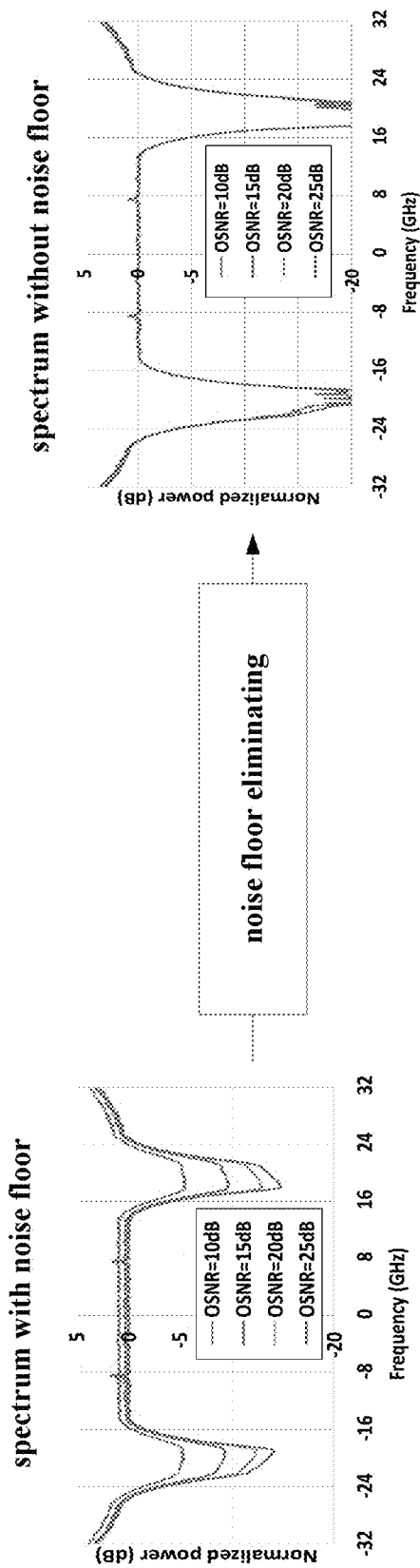
FIG. 10 is a schematic diagram of a principle of a noise eliminating unit.

FIG. 10 is a schematic diagram of a structure of an implementation of the noise eliminating unit 64. In this implementation, what is shown in the left spectrum diagram is a spectrum diagram of a receiver at different noise levels. It can be seen that different noise levels result in occurrence of relatively large deviation of amplitude of floor of spectrum gap, and such deviation will also influence the accuracy of the estimation of the gap width. In order to avoid phenomenon of correlation of an estimated value of a gap and a noise level, the noise eliminating unit 64 is used in this embodiment to perform noise elimination on the noise floor before the gap estimation. In particular, a lowest point of the spectrum amplitude is found and is taken as noise floor power, and then the noise floor power is subtracted at each frequency point (linear subtraction). The noise floor eliminated spectrum is as shown in the right spectrum diagram in FIG. 10. It can be seen that different noise levels will not influence the spectrum shape any longer, hence, the estimated value of the gap will not rely on the noise levels any longer.

With the apparatus 100 for correcting inter-channel power imbalance of this implementation, estimation errors produced due to power imbalance in the central channel and the neighboring channel may be reduced.

FIG. 11 is a schematic diagram of a structure of another implementation of the correcting unit 12. In this implementation, the reference information is a power ratio of the second channel to the noise floor calculated in the neighboring receiver, or power of the second channel calculated in the neighboring receiver. Likewise, the first channel here is a central channel in the current receiver and a neighboring channel in the neighboring receiver, and the second channel is a central channel in the neighboring receiver and a neighboring channel in the current receiver.

Referring to FIG. 11, the correcting unit 12 includes a determining module 111 and an adjusting module 112; wherein, the determining module 111 is configured to determine a signal power ratio between the first channel and the second channel according to a power ratio of the first channel to the noise floor and the power ratio of the second channel to the noise floor or according to power of the first channel and the power of the second channel, and the adjusting module 112 is configured to adjust the power or reference power of the second channel according to the signal power ratio.

FIGS. 12 and 13 are schematic diagrams of correction principles of this implementation. As shown in FIG. 12, in the receiver 1, a power ratio (a linear unit) of the channel #1 to the noise floor is denoted by PR1; and as shown in FIG. 13, in the receiver 2, a power ratio of the channel #2 to the noise floor is denoted by PR2. If signal power of the channel #1 is different from that of the channel #2, PR1 is not equal to PR2, hence, a signal power ratio ΔPower of the channel #1 to the channel #2 may be calculated based on values of PR1 and PR2, which is denoted by the equation below:

$$\Delta Power = \frac{PR1 - 1}{PR2 - 1}$$

Linear units are used in the above equation, which may be expressed as follows in using dB units:

$$\Delta Power[dB] = 10*log10\left(\frac{10^{PR1[dB]/10} - 1}{10^{PR2[dB]/10} - 1}\right)$$

In this equation, if the noise floor is very low, the signal power ratio between the two channels may be obtained directly according to the power of the channel #1 in the receiver 1 and the power of the channel #2 in the receiver 2, that is, $$\Delta Power = \frac{PR1}{PR2}$$

And it may be expressed as follows in using dB units:

$$\Delta Power[dB] = 10*log10\left(\frac{10^{PR1[dB]/10}}{10^{PR2[dB]/10}}\right)$$

After the signal power ratio between the channel #1 and the channel #2 is obtained, the spectrum may be corrected based on this value, thereby eliminating the influence of the power imbalance.

In an implementation, the influence of the power imbalance may be eliminated by adjusting the power of the second channel.

FIG. 14 is a schematic diagram of a principle of this implementation. As shown in FIG. 14, as the inter-channel power ratio is obtained, the power of the neighboring channel may be adjusted directly by an amount of ΔPower. With the spectrum adjustment, power of neighboring channels may be made equal, and the influence of the power imbalance may be eliminated.

In another implementation, the influence of the power imbalance may be eliminated by adjusting the reference power of the second channel.

Figure 15:
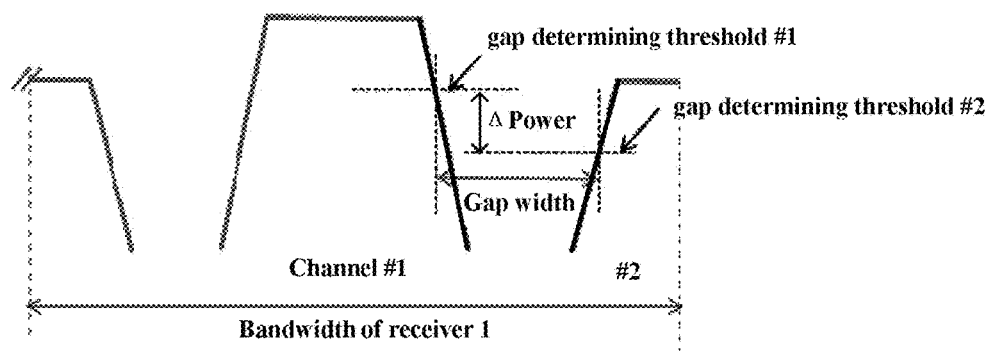
FIG. 15 is a schematic diagram of adjusting reference power of the receiver 2.

FIG. 15 is a schematic diagram of a principle of this implementation. As shown in FIG. 15, on the premise of not performing spectrum adjustment, adjustment of a gap determining threshold (reference power) may be performed. In a case of power imbalance, if a gap determining threshold of the channel #1 is kept unchanged, an amount of a change of a gap determining threshold of the channel #2 is still ΔPower. Based on different determining thresholds of the channel #1 and the channel #2, the influence of the power imbalance on the finally obtained gap value shall be greatly reduced.

Figure 16:
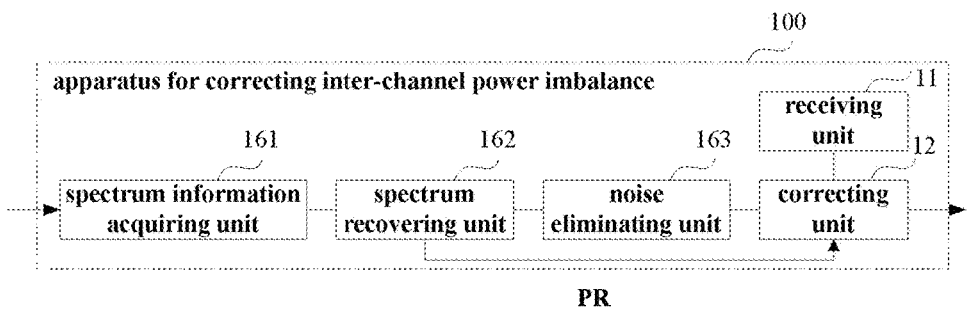
FIG. 16 is a schematic diagram of a structure of another implementation of the apparatus for correcting inter-channel power imbalance of the embodiment.

FIG. 16 is a schematic diagram of a structure of the apparatus for correcting inter-channel power imbalance of this implementation. As shown in FIG. 16, in this implementation, alternatively, the apparatus 100 for correcting inter-channel power imbalance may further include a spectrum information acquiring unit 161 and a spectrum recovering unit 162; wherein, the spectrum information acquiring unit 161 is configured to acquire a received signal and extract spectrum information from the received signal;

and the spectrum recovering unit 162 is configured to calculate the power ratio of the first channel to the noise floor or calculate the power of the first channel according to the spectrum information.

In this implementation, a structure and principle of the spectrum information acquiring unit 161 are identical to those shown in FIG. 7. Referring to FIG. 7, the spectrum information acquiring unit 161 may include a serial-to-parallel converting module 71, a Fourier transform module 72 and a calculating module 73. The serial-to-parallel converting module 161 is configured to divide a received signal into a predefined number of sections, the Fourier transform module is configured to perform Fourier transform on each section of signal, so as to obtain a spectrum of each section of signal, and the calculating module 73 is configured to calculate a modular square of the spectrum of each section of signal, so as to obtain a power spectrum of each section of signal, and average or weighted average power spectra of all sections of signals, so as to obtain an averaged power spectrum of all the sections of signals as the extracted spectrum information. Alternatively, the spectrum information acquiring unit 161 may further include a time-domain windowing module 74, so as to perform window function convolution on the spectrum of each section of signal.

In this implementation, the spectrum recovering unit 162 may further perform spectrum recovery on an input signal, and take the spectrum recovered signal as an input signal of a next step of processing, and its principle and structure are as shown in FIG. 9. For example, it may perform the spectrum recovery on the input signal by multiplying amplitude of each frequency point of the spectrum of the input signal by a correction coefficient. The correction coefficient may be a reciprocal of response amplitude of a receiver at each frequency point, which shall not be described herein any further.

In this implementation, as shown in FIG. 16, alternatively, the apparatus 100 for correcting inter-channel power imbalance may further include a noise eliminating unit 163; wherein, the noise eliminating unit 163 is configured to determine noise floor power of the input signal, and subtract the noise floor power at each frequency point of the input signal, so as to obtain a noise eliminated signal as an input signal of a next step of processing. In this implementation, a principle and structure of the noise eliminating unit 163 are as shown in FIG. 10, which shall not be described herein any further.

In this implementation, after the estimation error brought by the power imbalance being corrected by the correcting unit 12, subsequent processing may be performed, such as spectrum gap width measurement, channel spacing estimation, and wavelength monitoring, etc., thereby improving accuracy and performance of subsequent processing.

With the apparatus for correcting inter-channel power imbalance of this embodiment, estimation errors produced due to power imbalance in the central channel and the neighboring channel may be reduced.

Embodiment 2

An embodiment of the present disclosure further provides a coherent optical receiver in a multicarrier optical communication system, including the apparatus for correcting inter-channel power imbalance described in Embodiment 1.

Figure 17:
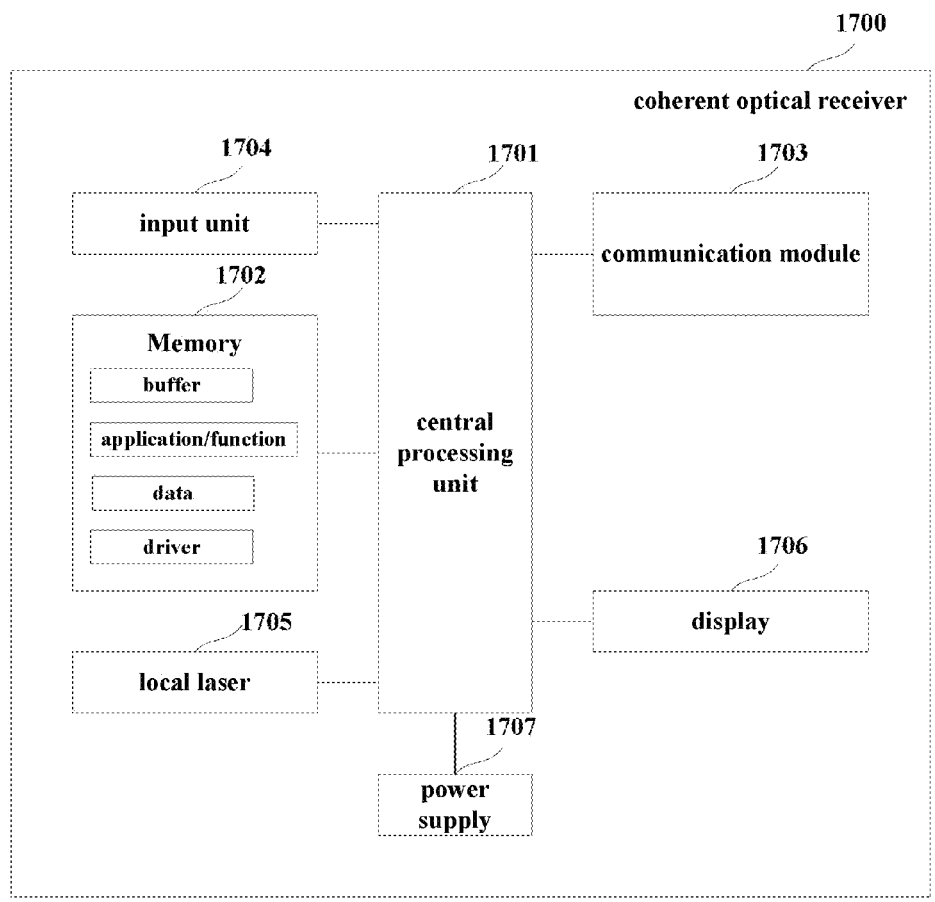
FIG. 17 is a schematic diagram of a structure of the coherent optical receiver of the embodiment.

FIG. 17 is a schematic diagram of a structure of the coherent optical receiver of this embodiment. As shown in FIG. 17, the coherent optical receiver 1700 may include a central processing unit (CPU) 1701 and a memory 1702, the memory 1702 being coupled to the central processing unit 1701. It should be noted that this figure is exemplary only, and other types of structures may be used to supplement or replace this structure for the realization of telecommunications functions or other functions.

In an implementation, functions of the apparatus for correcting inter-channel power imbalance described in Embodiment 1 may be incorporated into the central processing unit 1701.

In another implementation, the apparatus for correcting inter-channel power imbalance and the central processing unit 1701 may be configured separately. For example, the apparatus for correcting inter-channel power imbalance may be configured as a chip connected to the central processing unit 1701, with functions of the apparatus for correcting inter-channel power imbalance being realized under control of the central processing unit 1701.

As shown in FIG. 17, the coherent optical receiver 1700 may further include a communication module 1703, an input unit 1704, a local laser 1705, a display 1706, and a power supply 1707. It should be noted that the coherent optical receiver 1700 does not necessarily include all the parts shown in FIG. 17; furthermore, the coherent optical receiver 1700 may include components not shown in FIG. 17, and the prior art may be referred to.

As shown in FIG. 17, the central processing unit 1701 is sometimes referred to as a controller or control, and may include a microprocessor or other processor devices and/or logic devices. The central processing unit 1701 receives input and controls operations of every component of the coherent optical receiver 1700.

In this embodiment, the memory 1702 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 1701 may execute the program stored in the memory 1702, so as to realize information storage or processing, etc. Functions of other parts are similar to those of the prior art, which shall not be described herein any further. The parts of the coherent optical receiver 1700 may be realized by specific hardware, firmware, software, or any combination thereof, without departing from the scope of the present disclosure.

The coherent optical receiver of the embodiment of the present disclosure adopts the apparatus for correcting inter-channel power imbalance of an embodiment of this application to correct the influence brought by power imbalance, and reduces estimation errors produced due to power imbalance in the central channel and the neighboring channel.

Embodiment 3

Figure 18:
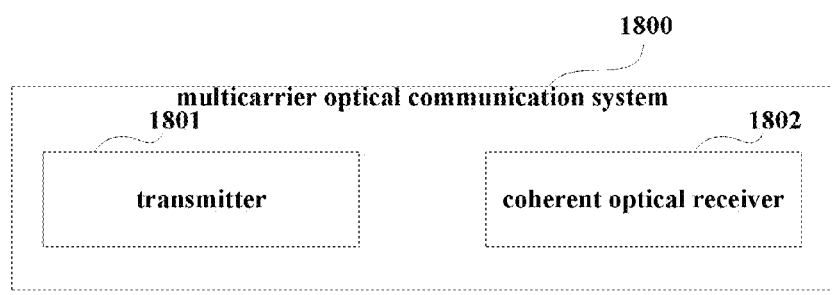
FIG. 18 is a schematic diagram of topology of the multicarrier optical communication system of the embodiment.

An embodiment of the present disclosure further provides a multicarrier optical communication system. FIG. 18 is a schematic diagram of a structure of the system. As shown in FIG. 18, the system 1800 includes a transmitter 1801 and a coherent optical receiver 1802. In this embodiment, the coherent optical receiver 1802 may be carried out by the coherent optical receiver 1700 in Embodiment 2, the contents of which being incorporated herein, and being not going be described herein any further.

With the multicarrier optical communication system provided by the embodiment of the present disclosure, estimation errors produced due to power imbalance in the central channel and the neighboring channel may be reduced.

Embodiment 4

Figure 19:
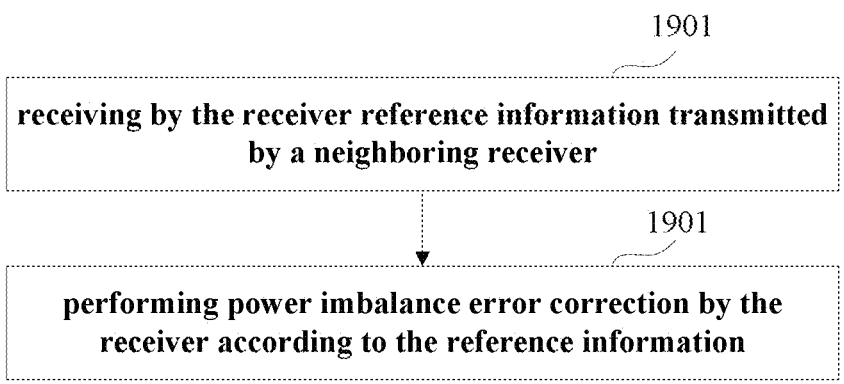
FIG. 19 is a flowchart of the method for correcting inter-channel power imbalance of the embodiment.

An embodiment of the present disclosure further provides a method for correcting inter-channel power imbalance, applicable to a receiver in a multicarrier optical communication system. FIG. 19 is a flowchart of the method. As principles of the method for solving problems is similar to that of the apparatus in Embodiment 1, the implementation of the apparatus in Embodiment 1 is referred to for the implementation of this method, with the identical parts being not going to be described herein any further.

Referring to FIG. 19, the method includes:

step 1901: receiving by the receiver reference information transmitted by a neighboring receiver; and step 1902: performing power imbalance error correction by the receiver according to the reference information.

In an implementation, the reference information is an estimation result of a spectrum gap width between a first channel and a second channel in the neighboring receiver, and step 1902 may include:

S1: averaging or weighted averaging an estimation result of a spectrum gap width between the first channel and the second channel in the receiver and the estimated result of the spectrum gap width between the first channel and the second channel in the neighboring receiver; and S2: identifying the averaged or weighted averaged value as the spectrum gap width between the first channel and the second channel;

in this implementation, the first channel is a central channel in the receiver and a neighboring channel in the neighboring receiver, and the second channel is a central channel in the neighboring receiver and a neighboring channel in the receiver.

In this implementation, the method may further include:

S001: acquiring a received signal;

S002: extracting spectrum information from the received signal; and

S003: determining reference power according to a predefined reference power level, and taking a frequency difference between two frequency points on a gap between the first channel and the second channel in the spectrum information of the received signal corresponding to the reference power as an estimation result of the spectrum gap width between the first channel and the second channel in the receiver.

In this implementation, S002 may include:

S0021: dividing the received signal into a predefined number of sections;

S0022: performing Fourier transform on each section of signal, so as to obtain a spectrum of each section of signal;

S0023: calculating a modular square of the spectrum of each section of signal, so as to obtain a power spectrum of each section of signal, and averaging or weighted averaging power spectra of all sections of signals, so as to obtain an averaged power spectrum of all the sections of signals as the spectrum information.

In this implementation, S002 may further include:

S0024: performing window function convolution on the spectrum of each section of signal. This step may be executed after S0021.

In this implementation, the method may further include:

S004: performing spectrum recovery on an input signal, and taking the spectrum recovered signal as an input signal of a next step of processing. This step may be executed after S001 and before S002, and may also be executed after S002 and before S003. In this implementation, the spectrum recovery may be performed on the input signal by multiplying amplitude of each frequency point of the spectrum of the input signal by a correction coefficient. In this implementation, the correction coefficient may be a reciprocal of response amplitude of a receiver at each frequency point.

In this implementation, the method may further include:

S005: determining noise floor power of the input signal, and subtracting the noise floor power at each frequency point of the input signal, so as to obtain a noise eliminated signal as an input signal of a next step of processing. This step may be located at any position before S003.

In another implementation, the reference information is a power ratio of the second channel to the noise floor calculated in the neighboring receiver, or power of the second channel calculated in the neighboring receiver, and step 1902 may include:

S1': determining a signal power ratio between the first channel and the second channel according to a power ratio of the first channel to the noise floor and the power ratio of the second channel to the noise floor or according to power of the first channel and the power of the second channel; and S2': adjusting the power or reference power of the second channel according to the signal power ratio;

in this implementation, the first channel is a central channel in the receiver and a neighboring channel in the neighboring receiver, and the second channel is a central channel in the neighboring receiver and a neighboring channel in the receiver.

In this implementation, the method may further include:

S111: acquiring a received signal;

S112: extract spectrum information from the received signal; and

S113: calculating the power ratio of the first channel to the noise floor or calculate the power of the first channel according to the spectrum information.

In this implementation, S112 may include:

S1121: dividing the received signal into a predefined number of sections;

S1122: performing Fourier transform on each section of signal, so as to obtain a spectrum of each section of signal;

S1123: calculating a modular square of the spectrum of each section of signal, so as to obtain a power spectrum of each section of signal, and averaging or weighted averaging power spectra of all sections of signals, so as to obtain an averaged power spectrum of all the sections of signals as the spectrum information.

In this implementation, S112 may further include:

S1124: performing window function convolution on the spectrum of each section of signal. This step may be executed after S1121 and before S1122.

In this implementation, the method may further include:

S114: performing spectrum recovery on the input signal, and taking the spectrum recovered signal as an input signal of a next step of processing. This step may be executed after S112 and before or after S113. In this implementation, the spectrum recovery may be performed on the input signal by multiplying amplitude of each frequency point of the spectrum of the input signal by a correction coefficient. In this implementation, the correction coefficient may be a reciprocal of response amplitude of a receiver at each frequency point.

In this implementation, the method may further include:

S115: determining noise floor power of the input signal, and subtracting the noise floor power at each frequency point of the input signal, so as to obtain a noise eliminated signal as an input signal of a next step of processing. This step may be located after S114.

By performing power imbalance correction by using the method of this embodiment, estimation errors produced due to power imbalance in the central channel and the neighboring channel may be reduced.

An embodiment of the present disclosure further provides a computer-readable program, wherein when the program is executed in an apparatus for correcting inter-channel power imbalance or a receiver, the program enables a computer to carry out the method as described in Embodiment 4 in the apparatus for correcting inter-channel power imbalance or the receiver.

An embodiment of the present disclosure further provides a storage medium in which a computer-readable program is stored, wherein the computer-readable program enables a computer to carry out the method as described in Embodiment 4 in an apparatus for correcting inter-channel power imbalance or a receiver.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principles of the present disclosure, and such variants and modifications fall within the scope of the present disclosure.

For the implementations of the present disclosure containing the above embodiments, following supplements are further disclosed.

Supplement 1. A method for correcting inter-channel power imbalance, applicable to a receiver in a multicarrier optical communication system, the method including:
receiving by the receiver reference information transmitted by a neighboring receiver; and
performing power imbalance error correction by the receiver according to the reference information.

Supplement 2. The method according to supplement 1, wherein the reference information is an estimation result of a spectrum gap width between a first channel and a second channel in the neighboring receiver, and the performing power imbalance error correction by the receiver according to the reference information includes:
averaging or weighted averaging an estimation result of the spectrum gap width between the first channel and the second channel in the receiver and the estimation result of the spectrum gap width between the first channel and the second channel in the neighboring receiver; and
identifying the averaged or weighted averaged value as the spectrum gap width between the first channel and the second channel;
wherein, the first channel is a central channel in the receiver and a neighboring channel in the neighboring receiver, and the second channel is a central channel in the neighboring receiver and a neighboring channel in the receiver.

Supplement 3. The method according to supplement 2, wherein the method further includes:
acquiring a received signal;
extracting spectrum information from the received signal; and
determining reference power according to a predefined reference power level, and taking a frequency difference between two frequency points in a gap between the first channel and the second channel in the spectrum information of the received signal corresponding to the reference power as the estimation result of the spectrum gap width between the first channel and the second channel in the receiver.

Supplement 4. The method according to supplement 3, wherein the extracting spectrum information from the received signal includes:
dividing the received signal into a predefined number of sections;
performing Fourier transform on each section of signal, so as to obtain a spectrum of each section of signal;
calculating a modular square of the spectrum of each section of signal, so as to obtain a power spectrum of each section of signal, and averaging or weighted averaging power spectra of all sections of signals, so as to obtain an averaged power spectrum of all the sections of signals as the spectrum information.

Supplement 5. The method according to supplement 4, wherein after dividing the received signal into a predefined number of sections, the method further includes:
performing window function convolution on the spectrum of each section of signal.

Supplement 6. The method according to supplement 3, wherein the method further includes:
performing spectrum recovery on an input signal, and taking the spectrum recovered signal as an input signal of a next step of processing.

Supplement 7. The method according to supplement 6, wherein the spectrum recovery is performed on the input signal by multiplying amplitude of each frequency point of the spectrum of the input signal by a correction coefficient.

Supplement 8. The method according to supplement 7, wherein the correction coefficient is a reciprocal of response amplitude of a receiver at each frequency point.

Supplement 9. The method according to supplement 3, wherein the method further includes:
determining noise floor power of the input signal, and subtracting the noise floor power at each frequency point of the input signal, so as to obtain a noise eliminated signal as an input signal of a next step of processing.

Supplement 10. The method according to supplement 1, wherein the reference information is a power ratio of the second channel to the noise floor calculated in the neighboring receiver, or the power of the second channel calculated in the neighboring receiver, and the performing power imbalance error correction by the receiver according to the reference information includes:
determining a signal power ratio between the first channel and the second channel according to a power ratio of the first channel to the noise floor and the power ratio of the second channel to the noise floor or according to power of the first channel and the power of the second channel; and
adjusting the power or reference power of the second channel according to the signal power ratio;
wherein, the first channel is a central channel in the receiver and a neighboring channel in the neighboring receiver, and the second channel is a central channel in the neighboring receiver and a neighboring channel in the receiver.

Supplement 11. The method according to supplement 10, wherein the method further includes:
acquiring a received signal;
extracting spectrum information from the received signal; and
calculating the power ratio of the first channel to the noise floor or calculate the power of the first channel according to the spectrum information.

Supplement 12. The method according to supplement 11, wherein the extracting spectrum information from the received signal includes:
dividing the received signal into a predefined number of sections;
performing Fourier transform on each section of signal, so as to obtain a spectrum of each section of signal;
calculating a modular square of the spectrum of each section of signal, so as to obtain a power spectrum of each section of signal, and averaging or weighted averaging power spectra of all sections of signals, so as to obtain an averaged power spectrum of all the sections of signals as the spectrum information.

Supplement 13. The method according to supplement 12, wherein after dividing the received signal into a predefined number of sections, the method further includes:

performing window function convolution on the spectrum of each section of signal.

Supplement 14. The method according to supplement 11, wherein the method further includes:

performing spectrum recovery on the input signal, and taking the spectrum recovered signal as an input signal of a next step of processing.

Supplement 15. The method according to supplement 14, wherein the spectrum recovery may be performed on the input signal by multiplying amplitude of each frequency point of the spectrum of the input signal by a correction coefficient.

Supplement 16. The method according to supplement 15, wherein the correction coefficient is a reciprocal of response amplitude of a receiver at each frequency point.

Supplement 17. The method according to supplement 11, wherein the method further includes:

determining noise floor power of the input signal, and subtracting the noise floor power at each frequency point of the input signal, so as to obtain a noise eliminated signal as an input signal of a next step of processing.

Supplement 18. An apparatus for correcting inter-channel power imbalance, applicable to a receiver in a multicarrier optical communication system, the apparatus including:

a receiving unit configured to receive reference information transmitted by a neighboring receiver; and a correcting unit configured to perform power imbalance error correction according to the reference information.

Supplement 19. The apparatus according to supplement 18, wherein the reference information is an estimation result of a spectrum gap width between a first channel and a second channel in the neighboring receiver, and the correcting unit includes:

a calculating module configured to average or weighted average an estimation result of the spectrum gap width between the first channel and the second channel in the receiver and the estimation result of the spectrum gap width between the first channel and the second channel in the neighboring receiver; and a correcting module configured to identify the averaged or weighted averaged value as the spectrum gap width between the first channel and the second channel;

wherein, the first channel is a central channel in the receiver and a neighboring channel in the neighboring receiver, and the second channel is a central channel in the neighboring receiver and a neighboring channel in the receiver.

Supplement 20. The apparatus according to supplement 19, wherein the apparatus further includes:

a spectrum information acquiring unit configured to acquire a received signal and extract spectrum information from the received signal; and a gap width measuring unit configured to determine reference power according to a predefined reference power level, and take a frequency difference between two frequency points in a gap between the first channel and the second channel in the spectrum information of the received signal corresponding to the reference power as the estimation result of the spectrum gap width between the first channel and the second channel in the receiver.

Supplement 21. The apparatus according to supplement 20, wherein the spectrum information acquiring unit includes:

a serial-to-parallel converting module configured to divide the received signal into a predefined number of sections;

a Fourier transform module configured to perform Fourier transform on each section of signal, so as to obtain a spectrum of each section of signal; and a calculating module configured to calculate a modular square of the spectrum of each section of signal, so as to obtain a power spectrum of each section of signal, and average or weighted average power spectra of all sections of signals, so as to obtain an averaged power spectrum of all the sections of signals as the spectrum information.

Supplement 22. The apparatus according to supplement 21, wherein the spectrum information acquiring unit further includes:

a time-domain windowing module configured to perform window function convolution on the spectrum of each section of signal.

Supplement 23. The apparatus according to supplement 19, wherein the apparatus further includes:

a spectrum recovering unit configured to perform spectrum recovery on an input signal, and take the spectrum recovered signal as an input signal of a next step of processing.

Supplement 24. The apparatus according to supplement 23, wherein the spectrum recovering unit performs the spectrum recovery on the input signal by multiplying amplitude of each frequency point of the spectrum of the input signal by a correction coefficient.

Supplement 25. The apparatus according to supplement 24, wherein the correction coefficient is a reciprocal of response amplitude of a receiver at each frequency point.

Supplement 26. The apparatus according to supplement 19, wherein the apparatus further includes:

a noise eliminating unit configured to determine noise floor power of the input signal, and subtract the noise floor power at each frequency point of the input signal, so as to obtain a noise eliminated signal as an input signal of a next step of processing.

Supplement 27. The apparatus according to supplement 18, wherein the reference information is a power ratio of the second channel to the noise floor calculated in the neighboring receiver, or power of the second channel calculated in the neighboring receiver, and the correcting unit includes:

a determining module configured to determine a signal power ratio between the first channel and the second channel according to a power ratio of the first channel to the noise floor and the power ratio of the second channel to the noise floor or according to power of the first channel and the power of the second channel; and an adjusting module configured to adjust the power or reference power of the second channel according to the signal power ratio;

wherein, the first channel is a central channel in the receiver and a neighboring channel in the neighboring receiver, and the second channel is a central channel in the neighboring receiver and a neighboring channel in the receiver.

Supplement 28. The apparatus according to supplement 27, wherein the apparatus further includes:

a spectrum information acquiring unit configured to acquire a received signal and extract spectrum information from the received signal; and a spectrum recovering unit configured to calculate the power ratio of the first channel to the noise floor or calculate the power of the first channel according to the spectrum information.

Supplement 29. The apparatus according to supplement 28, wherein the spectrum information acquiring unit includes:

a serial-to-parallel converting module configured to divide the received signal into a predefined number of sections;

a Fourier transform module configured to perform Fourier transform on each section of signal, so as to obtain a spectrum of each section of signal; and a calculating module configured to calculate a modular square of the spectrum of each section of signal, so as to obtain a power spectrum of each section of signal, and average or weighted average power spectra of all sections of signals, so as to obtain an averaged power spectrum of all the sections of signals as the spectrum information.

Supplement 30. The apparatus according to supplement 29, wherein the spectrum information acquiring unit further includes:

a time-domain windowing module configured to perform window function convolution on the spectrum of each section of signal.

Supplement 31. The apparatus according to supplement 28, wherein the spectrum recovering unit is further configured to:

perform spectrum recovery on an input signal, and take the spectrum recovered signal as an input signal of a next step of processing.

Supplement 32. The apparatus according to supplement 31, wherein the spectrum recovering unit performs the spectrum recovery on the input signal by multiplying amplitude of each frequency point of the spectrum of the input signal by a correction coefficient.

Supplement 33. The apparatus according to supplement 32, wherein the correction coefficient is a reciprocal of response amplitude of a receiver at each frequency point.

Supplement 34. The apparatus according to supplement 27, wherein the apparatus further includes:

a noise eliminating unit configured to determine noise floor power of the input signal, and subtract the noise floor power at each frequency point of the input signal, so as to obtain a noise eliminated signal as an input signal of a next step of processing.

Supplement 35. A coherent optical receiver, including the apparatus for correcting inter-channel power imbalance as described in any one of supplements 18-34.

What is claimed is:

1. An apparatus for correcting inter-channel power imbalance, applicable to an associated receiver in a multicarrier optical communication system, the apparatus comprising:

a receiving unit configured to receive reference information transmitted by a neighboring receiver; and a correcting unit configured to perform power imbalance error correction according to the reference information, wherein the reference information is an estimation result of a spectrum gap width between a first channel and a second channel in the neighboring receiver, and the correcting unit comprises:

a calculating module configured to one of average and weighted average the estimation result of the spectrum gap width between the first channel and the second channel in the associated receiver and the estimation result of the spectrum gap width between the first channel and the second channel in the neighboring receiver; and a correcting module configured to identify one of an averaged and weighted averaged value as the spectrum gap width between the first channel and the second channel;

wherein the first channel is a central channel in the associated receiver and a neighboring channel in the neighboring receiver, and the second channel is a central channel in the neighboring receiver and a neighboring channel in the associated receiver.

2. The apparatus according to claim 1, wherein the apparatus further comprises:

a spectrum information acquiring unit configured to acquire a received signal and extract spectrum information from the received signal; and a gap width measuring unit configured to determine reference power according to a predefined reference power level, and set a frequency difference between two frequency points on a gap between the first channel and the second channel in the spectrum information of the received signal corresponding to the reference power as the estimation result of the spectrum gap width between the first channel and the second channel in the associated receiver.

3. The apparatus according to claim 2, wherein the spectrum information acquiring unit comprises:

a serial-to-parallel converting module configured to divide the received signal into a predefined number of sections;

a Fourier transform module configured to perform Fourier transform on each section of the received signal to obtain a spectrum of each section of the received signal; and a calculating module configured to calculate a modular square of the spectrum of each section of the received signal to obtain a power spectrum of each section of the received signal, and one of average and weighted average power spectra of all sections of the received signals to obtain an averaged power spectrum of all the sections of the received signals as the spectrum information.

4. The apparatus according to claim 3, wherein the spectrum information acquiring unit further comprises:

a time-domain windowing module configured to perform a window function convolution on the spectrum of each section of the received signal.

5. The apparatus according to claim 1, wherein the apparatus further comprises:

a spectrum recovery unit configured to perform spectrum recovery on an initial input signal, and use a spectrum recovered signal as a next input signal of a next step of processing.

6. The apparatus according to claim 5, wherein the spectrum recovering unit performs the spectrum recovery on the initial input signal by multiplying an amplitude of each frequency point of the spectrum of the initial input signal by a correction coefficient.

7. The apparatus according to claim 6, wherein the correction coefficient is a reciprocal of a response amplitude of a receiver at each frequency point.

8. The apparatus according to claim 1, wherein the apparatus further comprises:

a noise eliminating unit configured to determine a noise floor power of an initial input signal, and subtract the noise floor power at each frequency point of the initial input signal to obtain a noise eliminated signal as a next input signal of a next step of processing.

9. An apparatus for correcting inter-channel power imbalance, applicable to an associated receiver in a multicarrier optical communication system, the apparatus comprising:
- a receiving unit configured to receive reference information transmitted by a neighboring receiver; and
- a correcting unit configured to perform power imbalance error correction according to the reference information wherein the reference information is one of a power ratio of the second channel power to the noise floor power calculated in the neighboring receiver and power of the second channel calculated in the neighboring receiver to the noise floor power calculated in the neighboring receiver, and the correcting unit comprises:
- a determining module configured to determine a signal power ratio between the first channel and the second channel one of according to a power ratio of the first channel to the noise floor and the power ratio of the second channel to the noise floor and according to power of the first channel and the power of the second channel; and
- an adjusting module configured to adjust one of the power and a reference power of the second channel according to the signal power ratio;
- wherein, the first channel is a central channel in the associated receiver and a neighboring channel in the neighboring receiver, and the second channel is a central channel in the neighboring receiver and a neighboring channel in the associated receiver.

10. The apparatus according to claim 9, wherein the apparatus further comprises:
- a spectrum information acquiring unit configured to acquire a received signal and extract spectrum information from the received signal; and
- a spectrum recovering unit configured to one of calculate the power ratio of the first channel to the noise floor and calculate the power of the first channel according to the spectrum information.

11. The apparatus according to claim 10, wherein the spectrum information acquiring unit comprises:
- a serial-to-parallel converting module configured to divide the received signal into a predefined number of sections;
- a Fourier transform module configured to perform Fourier transform on each section of the received signal to obtain a spectrum of each section of the received signal; and
- a calculating module configured to calculate a modular square of the spectrum of each section of the received signal to obtain a power spectrum of each section of the received signal, and one of average and weighted average power spectra of all sections of received signals to obtain an averaged power spectrum of all the sections of the received signals as the spectrum information.

12. The apparatus according to claim 11, wherein the spectrum information acquiring unit further comprises:
- a time-domain windowing module configured to perform a window function convolution on the spectrum of each section of the received signal.

13. The apparatus according to claim 10, wherein the spectrum recovering unit is further configured to:
- perform spectrum recovery on an initial input signal, and use the spectrum recovered signal as a next input signal of a next step of processing.

14. The apparatus according to claim 13, wherein the spectrum recovering unit performs the spectrum recovery on the initial input signal by multiplying an amplitude of each frequency point of the spectrum of the initial input signal by a correction coefficient.

15. The apparatus according to claim 14, wherein the correction coefficient is a reciprocal of a response amplitude at each frequency point.

16. The apparatus according to claim 10, wherein the apparatus further comprises:
- a noise eliminating unit configured to determine a noise floor power of the initial input signal, and subtract the noise floor power at each frequency point of the initial input signal to obtain a noise eliminated signal as a next input signal of a next step of processing.

17. A method for correcting inter-channel power imbalance, applicable to an associated receiver in a multicarrier optical communication system, the method comprising:
- receiving by the associated receiver reference information transmitted by a neighboring receiver; and
- performing power imbalance error correction by the associated receiver according to the reference information, wherein the reference information is an estimation result of a spectrum gap width between a first channel and a second channel in the neighboring receiver, and the performing the power imbalance error correction by the associated receiver according to the reference information comprises:
- one of averaging and weighted averaging an estimation result of the spectrum gap width between the first channel and the second channel in the associated receiver and the estimation result of the spectrum gap width between the first channel and the second channel in the neighboring receiver; and
- identifying the one of an averaged and weighted averaged value as the spectrum gap width between the first channel and the second channel;
- wherein, the first channel is a central channel in the associated receiver and a neighboring channel in the neighboring receiver, and the second channel is a central channel in the neighboring receiver and a neighboring channel in the associated receiver.

18. A method for correcting inter-channel power imbalance, applicable to an associated receiver in a multicarrier optical communication system, the method comprising:
- receiving by the associated receiver reference information transmitted by a neighboring receiver; and
- performing power imbalance error correction by the associated receiver according to the reference information, wherein the reference information is a power ratio of the second channel to one of the noise floor calculated in the neighboring receiver, and the power of the second channel calculated in the neighboring receiver, and the performing power the imbalance error correction by the associated receiver according to the reference information comprises:
- determining a signal power ratio between the first channel and the second channel one of according to a power ratio of the first channel to the noise floor and the power ratio of the second channel to the noise floor and according to power of the first channel and the power of the second channel; and
- adjusting one of the power and reference power of the second channel according to the signal power ratio;
- wherein, the first channel is a central channel in the associated receiver and a neighboring channel in the neighboring receiver, and the second channel is a central channel in the neighboring receiver and a neighboring channel in the associated receiver.

19. A coherent optical receiver, comprising an apparatus for correcting inter-channel power imbalance, configured to receive reference information transmitted by a neighboring receiver, and perform a power imbalance error correction according to the reference information,
wherein the reference information is an estimation result of a spectrum gap width between a first channel and a second channel in the neighboring receiver, and the apparatus for correcting inter-channel power imbalance is configured to:
one of average and weighted average the estimation result of the spectrum gap width between the first channel and the second channel in the associated receiver and the estimation result of the spectrum gap width between the first channel and the second channel in the neighboring receiver; and
identify one of an averaged and weighted averaged value as the spectrum gag width between the first channel and the second channel;
wherein, the first channel is a central channel in the associated receiver and a neighboring channel in the neighboring receiver, and the second channel is a central channel in the neighboring receiver and a neighboring channel in the associated receiver.

20. A coherent optical receiver, comprising an apparatus for correcting inter-channel power imbalance, configured to receive reference information transmitted by a neighboring receiver, and perform a power imbalance error correction according to the reference information,
wherein the reference information is one of a power ratio of the second channel power to the noise floor power calculated in the neighboring receiver and power of the second channel calculated in the neighboring receiver to the noise floor power calculated in the neighboring receiver, and the apparatus for correcting inter-channel power imbalance is configured to:
determine a signal power ratio between the first channel and the second channel one of according to a power ratio of the first channel to the noise floor and the power ratio of the second channel to the noise floor and according to power of the first channel and the power of the second channel; and
adjust one of the power and a reference power of the second channel according to the signal power ratio;
wherein, the first channel is a central channel in the associated receiver and a neighboring channel in the neighboring receiver, and the second channel is a central channel in the neighboring receiver and a neighboring channel in the associated receiver.

* * * * *